US010367986B1

(12) United States Patent
Berenberg et al.

(10) Patent No.: US 10,367,986 B1
(45) Date of Patent: Jul. 30, 2019

(54) FEEDBACK FOR A PRIVACY INDICATOR ON A SECURITY CAMERA

(71) Applicant: Amazon Technologies, Inc., Seattle, WA (US)

(72) Inventors: Paul Berenberg, Los Altos, CA (US); Ilya Vladimirovich Brailovskiy, Mountain View, CA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 15/620,535

(22) Filed: Jun. 12, 2017

(51) Int. Cl.
*H04L 27/06* (2006.01)
*H04N 5/232* (2006.01)
*G06K 9/00* (2006.01)
*G06K 9/46* (2006.01)
*G08B 5/36* (2006.01)
*G06T 5/20* (2006.01)

(52) U.S. Cl.
CPC ......... *H04N 5/232* (2013.01); *G06K 9/00577* (2013.01); *G06K 9/00771* (2013.01); *G06K 9/4661* (2013.01); *G08B 5/36* (2013.01); *G06T 5/20* (2013.01)

(58) Field of Classification Search
None
See application file for complete search history.

(56) References Cited

U.S. PATENT DOCUMENTS 6,996,282 B1 * 2/2006 Kondo ................ H04N 1/4105
375/E7.129
9,319,691 B2 * 4/2016 Nakayama ........... H04N 19/126

OTHER PUBLICATIONS

P. Hellekalek., "Good Random Number Generators are (not so) Easy to Find", Mathematics and Computers in Simulation 46 (Jun. 1998) IMACS/Elsevier Science B.V., pp. 485-505.
Matthew Brocker et al., "iSee You: Disabling the MacBook Webcam Indicator LED" 23rd USENIX Security Symposium (USENIX Security 14) 337-352 (Aug. 2014).

* cited by examiner

*Primary Examiner* — Md N Haque
(74) *Attorney, Agent, or Firm* — Knobbe, Martens, Olson & Bear, LLP

(57) ABSTRACT

Features are disclosed for a security camera including automated identification of disabled privacy indicators based on feedback included in monitored data (e.g., images). The features include generating a random number and adjusting light emitted by the privacy indicator to signal the random number. The camera may detect subtle changes (e.g., brightness, color, hue, intensity) in the image, a sequence of images, or portions thereof that can be decoded and compared to the random number. If there is a discrepancy between the random number and decoded value, an indication of tampering with the privacy indicator may be provided.

20 Claims, 5 Drawing Sheets

FEEDBACK FOR A PRIVACY INDICATOR ON A SECURITY CAMERA

BACKGROUND

Many security and monitoring cameras include a recording indicator to assure customer privacy. Cameras without such an indicator are essentially spy cameras. To prevent intentional or unintentional disablement of the indicator a camera may control the indicator in hardware. Thus, no malicious action in software, defect in the software, or over-the-air programming could disable it. The privacy indicator may be intended not only for the user who purchased the device, but also for anyone who might be recorded by the camera.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Described are features for a camera system including feedback for detecting and responding to a disabled indicator light. The features described allow the camera system to identify indicator disablement. The systems and methods described can detect intentional disablement or unintentional disablement such as due to a simple breakage of the indicator or the indicator being covered. The camera system may continuously generate random numbers by hardware or software. The camera system may modulate the random numbers and provide it or an encoding thereof to the visual indicator. The encoding of the random number may be modulated to correspond to a frequency (e.g., 10 Hz) lower than the camera's frame rate and at an amplitude that does not cause any visible image disturbance (e.g., 10% of brightness) of the images captured.

An image sensor included in the camera system may have a sufficient sensitivity to analyze the brightness variations to decode the sequence. The decoded sequence may then be compared to the current random number to determine whether the indicator light is disabled. For example, if the loss of the visual indicator random sequence is detected, the camera system can perform an alternative indication to the user. Examples of alternative indicators include activating an audio output device (e.g., buzzer, speaker) to generate a perceivable audio indication, or sending a notification to a mobile device. Optionally, the camera recording can be disabled based on the positive feedback or, on the contrary, can be turned continuously on. Additional redundancy can be added to the modulated signal including error correction capability to reduce a probability of false positives. The random nature of the encoded values captured in the image stream can prevent replay attacks where a user presents a pre-recorded sequence of images to the camera system.

One common disablement of the indicator light is to obstruct the indicator light. Thus, the camera system may activate the indicator light as designed, but due to the obstruction, the intent of the indicator is subverted. To address this and other disablements, the features include consideration of feedback from the indicator light to determine whether the indicator is functioning as intended.

Figure 1:
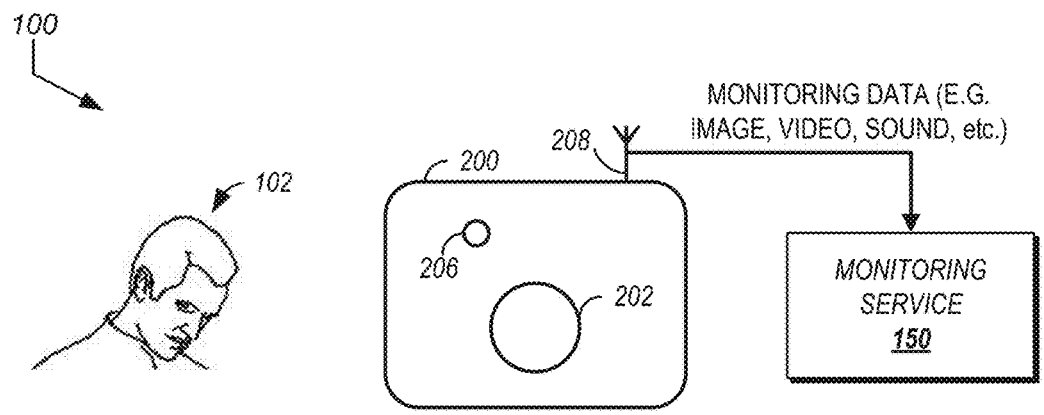
FIG. 1 is a block diagram depicting an example operating environment including an example camera system that may implement one or more of indicator feedback features in accordance with the present disclosure.

FIG. 1 is a block diagram depicting an example operating environment including a camera system. The environment 100 may include a camera system 200. The camera system 200 may be included to monitor activity in an area such as capturing one or more images of a subject 102. The camera system 200 may capture still photos or video images. The subject 102 is shown as a human, but the subject 102 can be non-human (e.g., a pet) or even inanimate subjects such as a room or a physical object (e.g., a painting, a plant, a sculpture, a door, a car, etc.).

The camera system 200 may transmit monitoring data to a monitoring service 200. The monitoring data may be transmitted in one or more messages. The messages may be formatted according to a standardized protocol such as TCP/IP, HTTP, FTP, or the like. The transmission may be sent wired, wireless, or hybrid wired-wireless networks. The camera system 200 may include a wireless transceiver 208 configured to transmit standardized, computer-readable messages to the monitoring service 150 or other network communication device. In some implementations, the communication between the monitoring service 150 and the camera system 200 may include a network (not shown) or communication intermediaries (e.g., network hub, router, base station, access point, etc.). The monitoring service 150 may analyze the monitoring data such as to identify the subject 102, determine whether a response to the monitored data is needed (e.g., criminal activity, public safety concerns, etc.), or store the monitoring data for further processing. The transceiver 208 may include a modem for modulating and demodulating communications transmitted or received by an antenna coupled to or included in the transceiver 208. The transceiver 208 may be able to communicate over a variety of networks, such as a cellular network, a network using an IEEE 802.11 protocol (e.g., WI-FI®), a network using a BLUETOOTH® protocol, and/or the like.

The monitoring data may include image, video, sound, or other measurement of the environment 100 such as temperature, humidity, barometric pressure, ambient light, etc. To collect the monitoring data, the camera system 200 may include one or more sensors. As shown in FIG. 1, the camera system 200 includes an image sensor 202. The image sensor 202 may be implemented in whole or in part using a camera configured to capture a single image, a series of images, or video images within a field of view for the camera. The camera system 200 may initiate the collection of monitoring data based on a characteristic of the environment 100. For example, an activation sensor (not shown) may be included. The activation sensor may include a motion sensor. The motion sensor may detect movement within the environment 100 and initiate collection of monitoring data (e.g., activate the camera 202 for recording). Additional or alternative sensors may be included to determine when to activate collection of monitoring data such as a temperature sensor, a light sensor, a clock, wireless signal detector, a position sensor, a proximity sensor, a sound detector, or the like.

The camera system 200 may include elements to facilitate collection of monitoring data. For example, an illuminator 208 may be included. The illuminator 208 may provide additional lighting to an area being monitored. The illuminator 208 may be activated based on information from an activation sensor or from the microprocessor 290. The illuminator 208 may be visible light emitter or an invisible light emitter such as infrared light illuminator. Other examples of collection facilitation elements include one or more servos for adjusting the position of the sensors (e.g., object tracking), a secondary power source (e.g., battery or solar) to provide power when a primary power source fails or is exhausted, or the like.

As discussed, the camera system 200 may include a privacy indicator 206. The privacy indicator 206 may provide a perceivable indication of a current monitoring state for the camera system 200. For example, the privacy indicator 206 may be implemented with one or more light emitting elements such as light emitting diodes (LEDs). In some implementations, a light emitting indicator can be controlled using activation signals to dynamically adjust a property of the light emitted. For example, the brightness of the light may be controlled by adjusting a control signal or voltage driving the LED. This control can be used to indicate different monitoring states such as recoding when the indicator 206 is driven at 50% brightness, recording and transmitting to the monitoring service 150 when the indicator is driven at 75% brightness, or live viewing of the monitoring data when the indicator is driven at the 100%. Brightness is one property of the light emitted by an LED privacy indicator that may be adjusted. The color may be adjusted such that, for example one color is associated with a first monitoring state and a second color is associated with a different monitoring state. The rate at which the indicator is activated may be adjustable to indicate monitoring state. For example, 30 activations of the indicator 206 per minute may be used to indicate a first state while a higher or lower blink rate may be used to indicate a second state.

Figure 2:
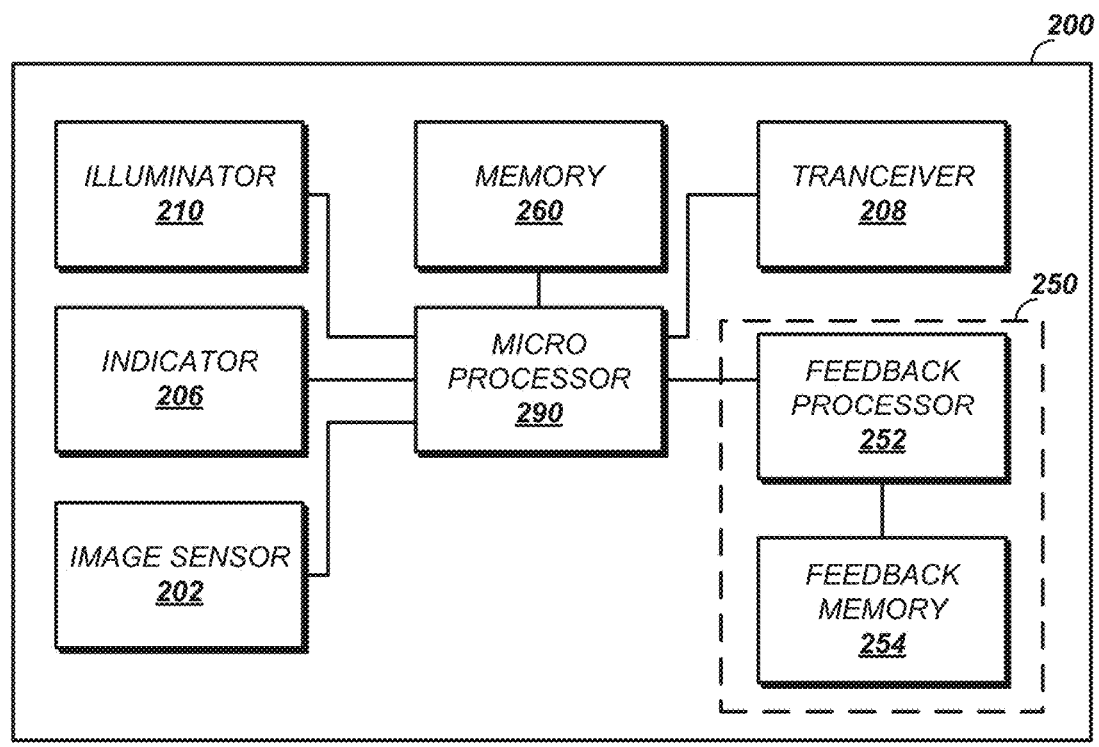
FIG. 2 is a block diagram depicting the example camera system shown in FIG. 1 in more detail.

FIG. 2 is a block diagram showing an example camera system that may implement one or more of the indicator feedback features described. The camera system 200 may include or be implemented with an electronic communication device such as a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

As discussed in FIG. 1, the camera system 200 may include the indicator 206 and the image sensor 202. The camera system 200 may also include a memory 260. The memory 260 may contain computer program instructions that the microprocessor 290 executes in order to implement one or more embodiments. The memory 260 may include RAM, ROM, and/or other persistent, non-transitory computer readable media. The memory 260 can store an operating system that provides computer program instructions for use by the microprocessor 290 or other elements included in the camera system 200 in the general administration and operation of the camera system 200. The memory 260 can further include computer program instructions and other information for implementing aspects of the present disclosure.

The microprocessor 290 may be configured to provide a signal to activate the indicator 206. The signal may be generated based on a current monitoring status for the camera system 200. For example, if the image sensor 202 is actively recording, the microprocessor 290 may drive the indicator 206 with a signal causing light having first characteristic(s) (e.g., color, brightness, intensity, hue, etc.) to be emitted from the indicator 206. The microprocessor 290 may also generate the signal based on a random value. Some image sensors may be sensitive enough to capture a random adjustment to the light emitted from the indicator 206. The adjustments may be detected as an absolute value for the image or as a relative value in comparison to another image. The random value may be encoded in these differences. As the camera system 200 continues operation, the detected adjustments may be decoded to identify a detected random value. If the detected random value does not correspond to the generated random value, the indicator 206 may be deemed disabled.

Figure 3:
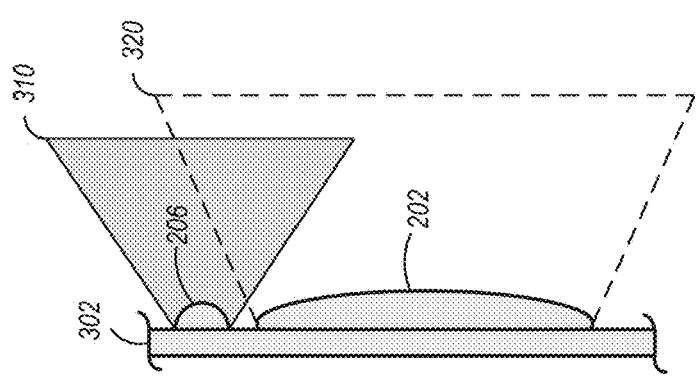
FIG. 3 is a pictorial diagram illustrating an example configuration of an image sensor and indicator for detecting indicator feedback.

FIG. 3 is a pictorial diagram illustrating an example configuration of an image sensor and indicator for detecting indicator feedback. The configuration shown in FIG. 3 includes a substrate 302. The substrate 302 may include the housing of the camera system 200 or a printed circuit board included therein. The substrate 302 may include the indicator 206 and the image sensor 202. FIG. 3 also illustrates an indicator illumination area 310. The indicator illumination area 310 may represent a portion of the environment 100 where properties of the light emitted by the indicator 206 can be detected. FIG. 3 also shows a capture region 320 which may represent a portion of the environment 100 captured in images taken by the image sensor 202. As shown, the indicator 206 may be disposed such that a portion of the indicator illumination area 310 overlaps with the capture region 320. In such a configuration, the image sensor 202 may capture images that include information indicative of a color quality for the emissions from the indicator 206. As discussed, the color quality may include brightness, color, hue, intensity, or other color characteristics.

The configuration shown in FIG. 3 may include additional image processing to ensure that the captured images are not distorted due to the emissions of the indicator 206. In such configurations, image processing may be included to generate a filtered image based on the captured image and the state of the indicator 206 when the image was captured. For example, if the indicator 206 is driven by the microprocessor 290 using variable brightness to encode the random value, the random brightness adjustments can be filtered out of the captured image to reduce the visual artifacts caused by the indicator 206.

Figure 4B:
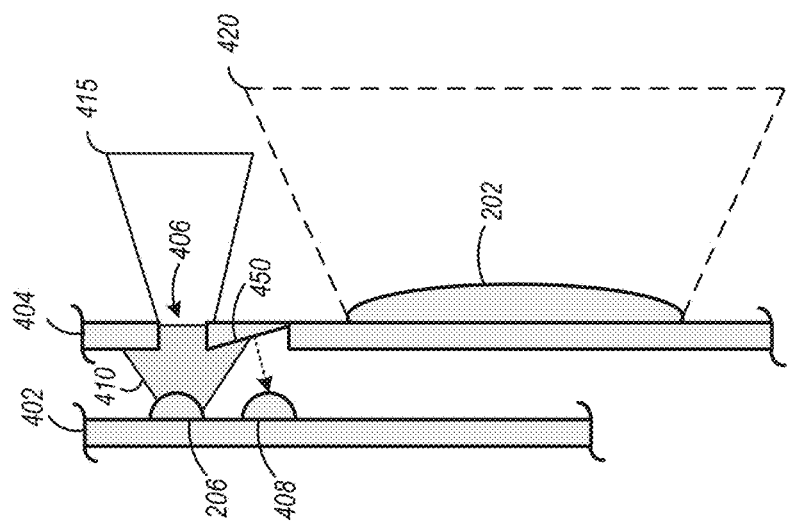
FIG. 4B is a pictorial diagram illustrating an example configuration of another image sensor and indicator for detecting indicator feedback using a light sensor and a reflective surface.
Figure 4A:
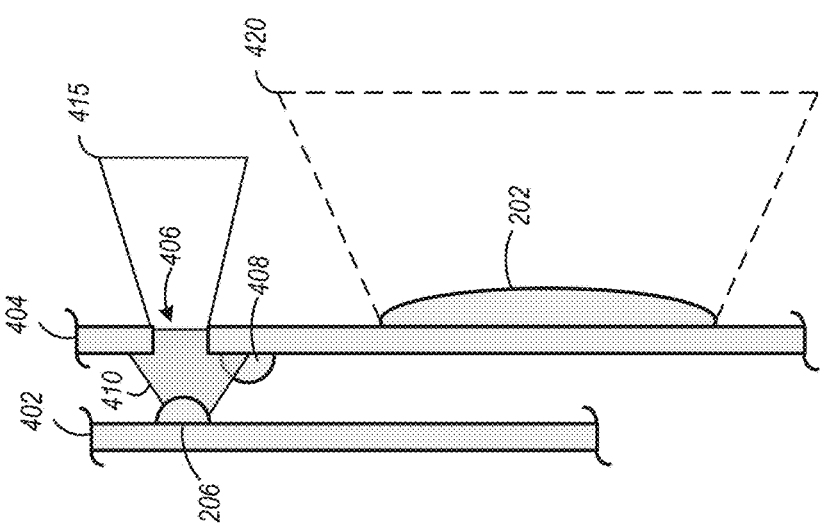
FIG. 4A is a pictorial diagram illustrating an example configuration of another image sensor and indicator for detecting indicator feedback using a light sensor.

FIG. 4A is a pictorial diagram illustrating an example configuration of another image sensor and indicator for detecting indicator feedback using a light sensor. The configuration of FIG. 4A provides a configuration that can avoid visual artifacts arising from varying the indicator 206 through physical orientation of the elements.

The arrangement in FIG. 4A includes an outer substrate 404 and an inner substrate 402. The outer substrate 404 may be the housing of the camera system 200 and be exposed to the environment 100 or the subject 102. The outer substrate 404 may include the image sensor 202. The image sensor 202 may be affixed to an outer surface of the outer substrate 404 to allow the image sensor 202 to capture images of the environment 100. On an inner surface of the outer substrate 404, a light detector 408 may be included. In this light detector 408 may be disposed to capture at least a portion of light within an indicator illumination area 410. A gap 406 in the outer substrate 404 may be provided. The gap 406 may allow a portion of the indicator light to be emitted to the environment 100. This portion is shown as a visible indicator illumination area 415. Notably, the area 415 does not perceptively overlap with a capture area 420 of the image sensor 202. The gap 406 also allows light to be collected by the light sensor 408 from the environment 100. This can be important to ensure that the gap 406 is not blocked or otherwise obstructed and thus disabling perception of the indicator 206.

FIG. 4B is a pictorial diagram illustrating an example configuration of another image sensor and indicator for detecting indicator feedback using a light sensor and a reflective surface. The arrangement in FIG. 4B is similar to the arrangement shown in FIG. 4A. However, in some implementations, it may be desirable to include the light sensor 408 on the inner substrate 402 rather than on the outer substrate 404. In this configuration, a reflective surface 450 may be included to direct a portion of the light from the illumination area 410 to the light sensor 408. As with FIG. 4A, the gap 406 may be disposed to allow a portion of the light from the indicator 206 to pass through the outer substrate 404 to the environment 100. The gap 406 may also allow light to pass from the environment 100 to the light sensor 408 to confirm the gap 406 is not blocked or otherwise obstructed. As also shown in FIG. 4A, in FIG. 4B, the indicator illumination area 415 does not overlap with the capture area 420. Thus, the need for image filtering may be diminished as compared to the configuration shown in FIG. 3.

Returning to FIG. 2, the feedback processor 252 may be implemented as a circuit to generate the random value and process the detected information to determine whether the indicator 206 is disabled. For example, the random value may be a random number that can be represented using eight bits (e.g., a number in the range of 0-256). If higher degrees of security are needed, the random value may be a larger number or include non-numeric characters. As the size increases or characters used for the random value such as a number using ten, twelve, or thirty six bits. The more bits used to represent the random number, the more secure the random number may be. However, the number of bits encoded may suffer from error in detection because more data points may be needed to provide a longer encoding. As the number of images used to detect the encoded values increases, the chances for error in decoding any one image increases.

The encoding used for the camera system 200 may be based on the image capture capabilities of the camera system 200. For example, if the image sensor 202 can capture images at a frame rate of thirty frames per second, it may be desirable to drive the indicator 206 with certain characteristics for a duration of time that spans three frames. This allows encoding of up to ten bits of data (e.g., 30 frames divided into blocks of three images, each block encoding one value). Using sequential blocks can account for minor variations such as due to ambient lighting conditions (e.g., shadows, cloud cover, etc.) because the detection of an encoded value may be a function of the properties of three sequential images rather than a single image or measurement.

Figure 5:
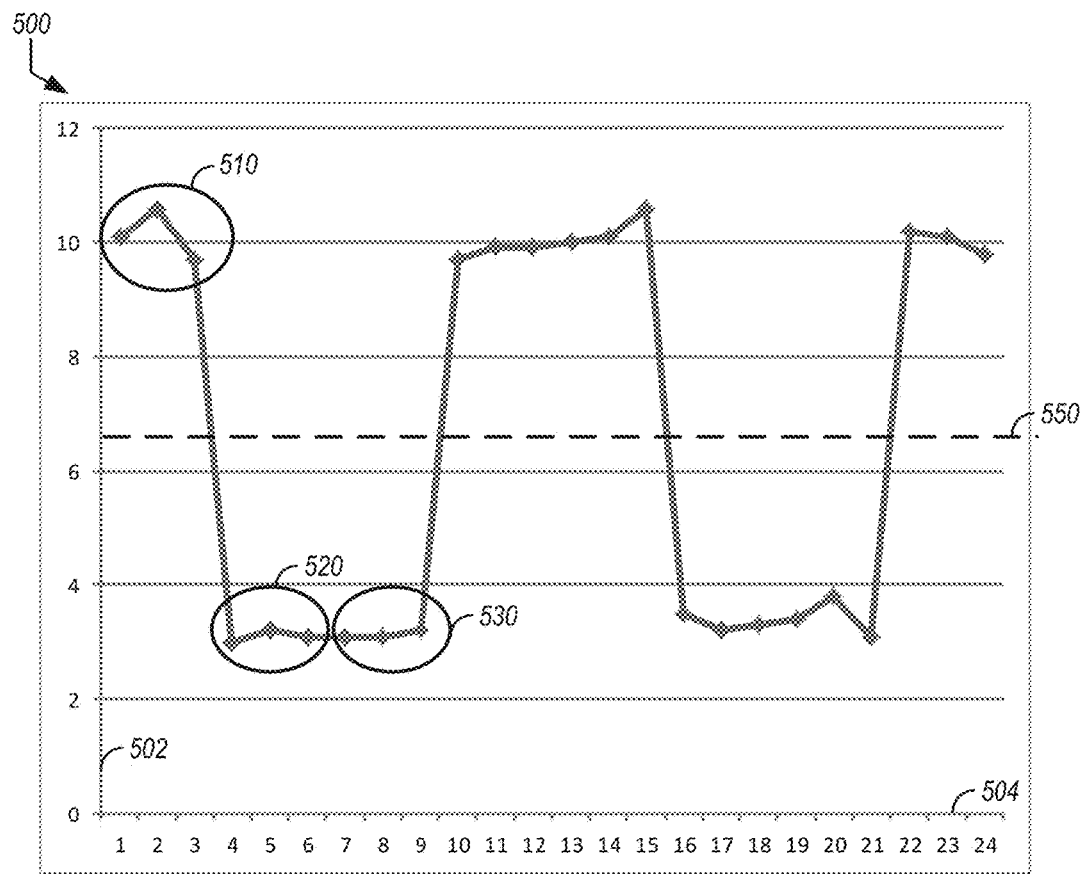
FIG. 5 is a data plot of example measurements for an indicator.

FIG. 5 is a data plot of example measurements for an indicator. The measurement values are represented by a Y-axis 502 while the images are represented by an X-axis 504. As shown in FIG. 5, blocks of three images may be used to encode binary values. The camera system 200 may include a measurement threshold 550. If a measurement for an image is above the measurement threshold 550, the encoded value may be a "1." If a measurement for an image is below the measurement threshold 550, the encoded value may be a "0." A first block 510 includes measurements for three images (images 1, 2, and 3) which are above the measurement threshold 550. Blocks 520 and 530 are below the measurement threshold 550. With such a pattern, the random value encoding detected by the system is "100." This may be a binary representation of the random number (e.g., 4). In some implementations, the number of bits may be more than three such as eight, ten, or twelve bits.

The measurements may be obtained through analysis of images captured by the image sensor 202. In some implementations, such as those shown in FIG. 4A or FIG. 4B, the measurements may be obtained from another sensor such as the light sensor 408. The analysis may include analyzing all or a portion of the pixels included in the image. For example, if the position of an indicator light is to the left of the image sensor, it may be desirable to limit the detection to pixels on the left side of images captured by the image sensor. The search space may be a configuration based on the specific geometry of the camera system.

Figure 6:
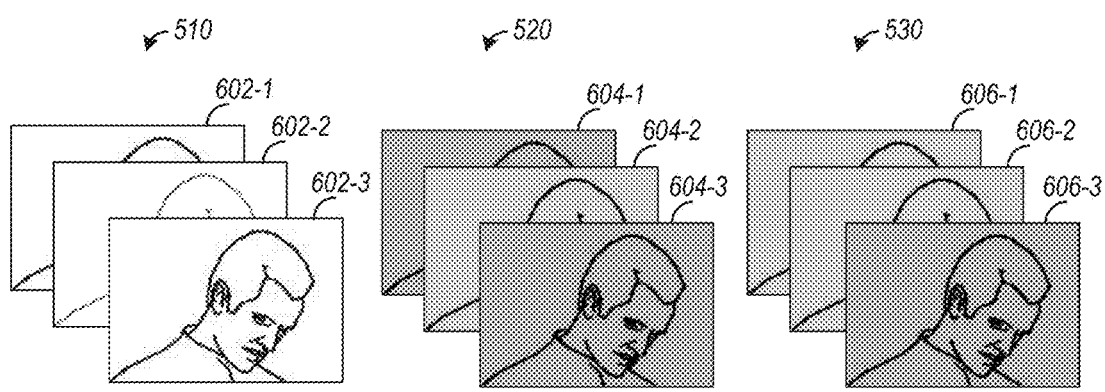
FIG. 6 is a pictorial diagram showing three blocks of images corresponding to some of the blocks shown in FIG. 5.

FIG. 6 is a pictorial diagram showing three blocks of images corresponding to some of the blocks shown in FIG. 5. The first block 510 may include images 602-1, 602-2, and 602-3. The measurement for the image 602-1 may be brightness. In comparison to the second block 520 of images (e.g., images 604-1, 604-2, and 604-3), the images in the first block 510 are brighter than the images in the second block 520. Similarly, the images in a third block 530 of images (e.g., images 606-1, 606-2, and 606-3) may also be of lower brightness than those included in the first block 510. Brightness is one example of the image characteristic that can be detected. In some implementations, other color properties may be identified such as hue, intensity, or other detectable property.

The use of the measurement threshold 550 can allow a binary encoding scheme. In some implementations, alternate encoding schemes using similar principles may be included. For example, the encoding may be based on a distance from the block to the measurement threshold 550. The distance may be represented as an average distance for each measurement included in the block. The distance may provide more granularities in the values that can be encoded over a binary encoding. In some implementations, the encoding may be a relative encoding between images. In such implementations, the measurement threshold 550 may not be needed as the basis for comparison may include the difference between measurements for images.

To facilitate identification of the beginning of an encoding, a known pattern may be included. For example, the camera system 200 may cause the indicator 206 to output at a predetermined level for a predetermined number of images. This preamble may be referred to as a preamble. The feedback processor 252 may identify this pattern and begin decoding for the image captured after the element included in the pattern. For example, in a binary encoding scheme, the preamble may be full brightness for 30 seconds. This may correspond to measurements above the measurement threshold 550 for ten consecutive blocks. The eleventh block would then be the first encoding of the first portion of the random value. Other schemes may be implemented to indicate the start of a new random value.

Figure 7:
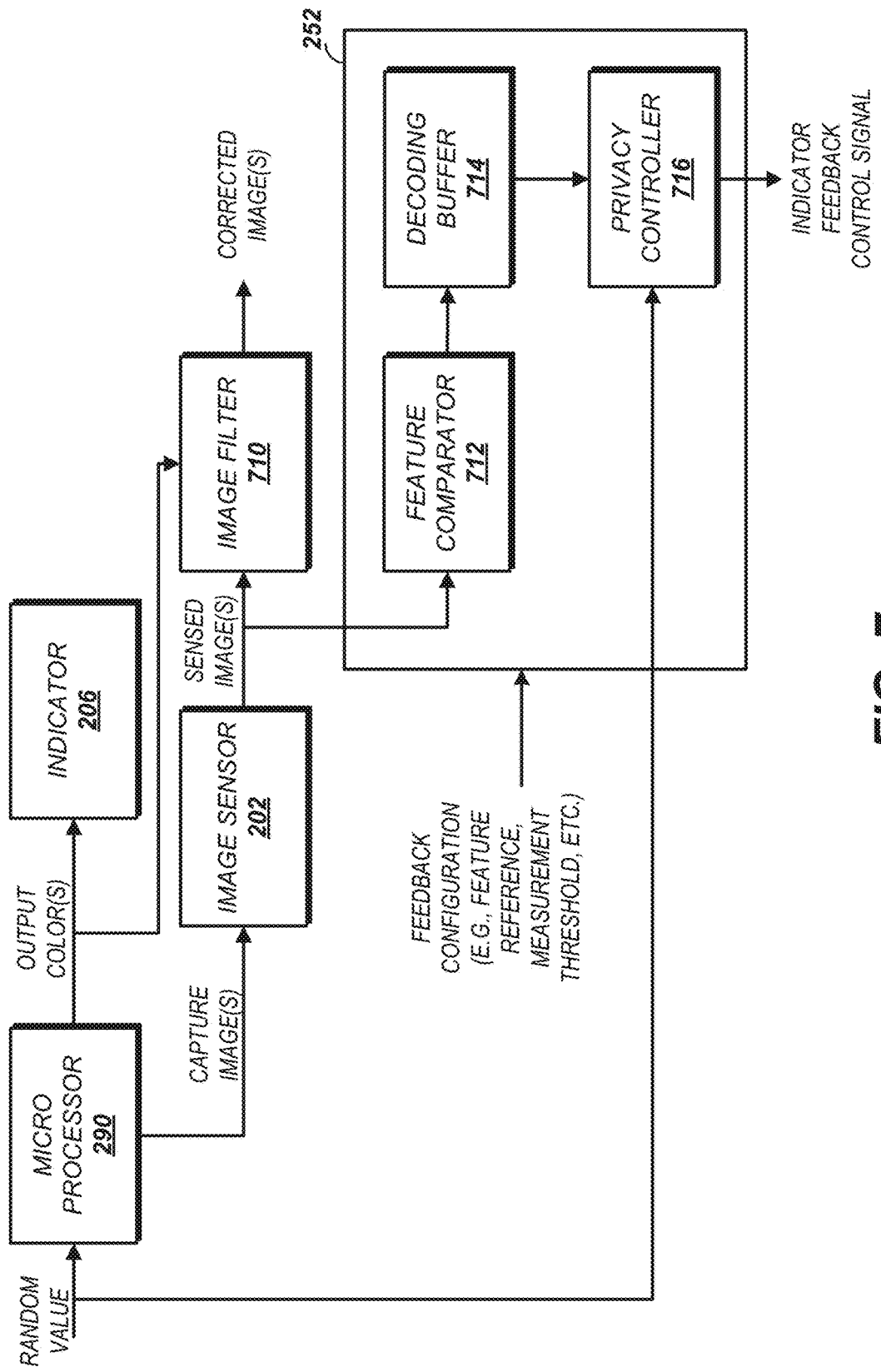
FIG. 7 shows a block diagram of an example processing pipeline for obtaining and processing indicator feedback.

FIG. 7 shows a block diagram of an example processing pipeline for obtaining and processing indicator feedback. The microprocessor 290 may receive the random value. The random value may be generated by the feedback processor 250. The microprocessor 290 may generate one or more signals to indicate output color(s) for the indicator 206. The signal may include adjusting the voltage to the indicator 206. The signal may include a control message to configure one or more operational parameters of the indicator 206 such as color, brightness, etc. The microprocessor 290 may also provide a signal to the image sensor 202 to cause capturing of images. To remove any artifacts caused by varying the indicator 206, the one or more output color signals may be provided to an image filter 710 along with a sensed image. The image filter 710 may generate a corrected image by correcting variations caused by the indicator 206 from the sensed image. In some implementations, this may be referred to as "normalization" of the image. The correction may include reducing or increasing the color values of pixels included in the sensed image based on the variation included in the output color signal. The variation may be dynamically determined based on a relationship between the output color signal and a baseline color signal. A baseline color signal may be associated with an operational state (e.g., recording, live viewing, etc.).

Table 1 provides example baselines and adjustments for specific brightness measurements. The baselines may be progressive in that when a threshold is exceeded, the baseline adjustments shift in scale (e.g., compare 30% and 60% baselines). As shown in Table 1, the adjustment is a difference between the detected brightness and the measurement. In some implementations, the adjustment may include additional factors such as weight based on the baseline used. This allows different processing for images collected for different operational states.

TABLE 1

| Baseline | Detected Brightness | Adjustment |
| --- | --- | --- |
| 30% | 40% | −10% |
| 30% | 20% | +10% |
| 30% | 62% | None, move to 60% baseline |
| 60% | 62% | −2% |
| 60% | 93% | None, move to 90% baseline |
| 90% | 93% | −3% |

The sensed image may also be provided to the feedback processor 252. The feedback processor 252 may include a feature comparator 712 configured to detect the value encoded by an image. The feature comparator 712 may obtain the measurement threshold 550 or other feature reference from a feedback configuration. The feedback configuration may be stored in a memory such as the feedback memory 254.

The feature comparator 712 may provide a comparison result to a decoding buffer 714. The decoding buffer 714 may hold the values detected from images (e.g., the binary digits encoding the random value). Once the buffer accumulates the requisite number of values, a privacy controller 716 may determine whether the value represented in the decoding buffer 714 corresponds to the random value initially provided to the microprocessor 290. Correspondence may include a checking for equality (e.g., whether the random number matches the number encoded by the values in the decoding buffer).

The privacy controller 716 may provide an indicator feedback control signal indicating whether the value represented in the decoding buffer 714 corresponds to the random value initially provided to the microprocessor 290. It may be desirable for the indicator feedback control signal to break a physical switch included in the camera system 200 to, for example, disable recording when the random value is not detected or cut power to all or a portion of the camera system 200. In some implementations, it may be desirable to cause the camera system 200 to permanently activate recording when the random value is not detected. In some implementations, the indicator feedback control signal may cause the camera system 200 may transmit a message, such as to the monitoring service 150, indicating potential disablement of the indicator 206. In some implementations, the indicator feedback control signal may activate another element included in the camera system 200 such as an audio alert or the illuminator 210 to provide an indication of possible disablement.

As shown in FIG. 7, the processing pipeline may process multiple images. In some implementations, it may be desirable to take action when a threshold number of failures are detected. For example, it may not be desirable to disable the camera system 200 upon a single instance of the decoded value failing to correspond to the random value. It may be desirable to include an accumulator that collects a number of consecutive failures. If the count of failures indicated by the accumulator exceeds the failure threshold, then the indicator feedback control signal may be provided as described. If a successful correspondence is detected (or a predetermined number of consecutive successful determinations are detected), the accumulator may be reset to zero.

Returning to FIG. 2, it may be desirable to include the feedback processor 252, the feedback memory 254, or portions thereof in a secured location 250. The secured location 250 may be isolated from external tampering such as programming or signal disruption. For example, circuitry or instructions for the random number generation or evaluation may be implemented in the secured location 250. Using non-reprogrammable hardware can decrease the vulnerability of the camera system 200 to indicator disablement because the components included in the camera system 200 for generating and assessing the indicator feedback may operate in a trusted space within the camera system 200. ARM® TRUSTZONE® is one example of a commercially available product that can be used to implement the secured location 250.

In some embodiments, the camera system 200 may include additional or fewer components than are shown in FIG. 2. For example, the camera system 200 may include more than microprocessor 290 and memory 260. In another example, the camera system 200 may the secure location 250 and one or more elements shown therein may be commonly implemented with the microprocessor 290. In some embodiments, the camera system 200 may include distributed network of components. For example, the image sensor 202 may communicate with a base station that includes the microprocessor 290. In such implementations, elements of the camera system 200 may not be physically contained within the same device, but rather communicatively coupled to provide aspects of the described features.

Figure 8:
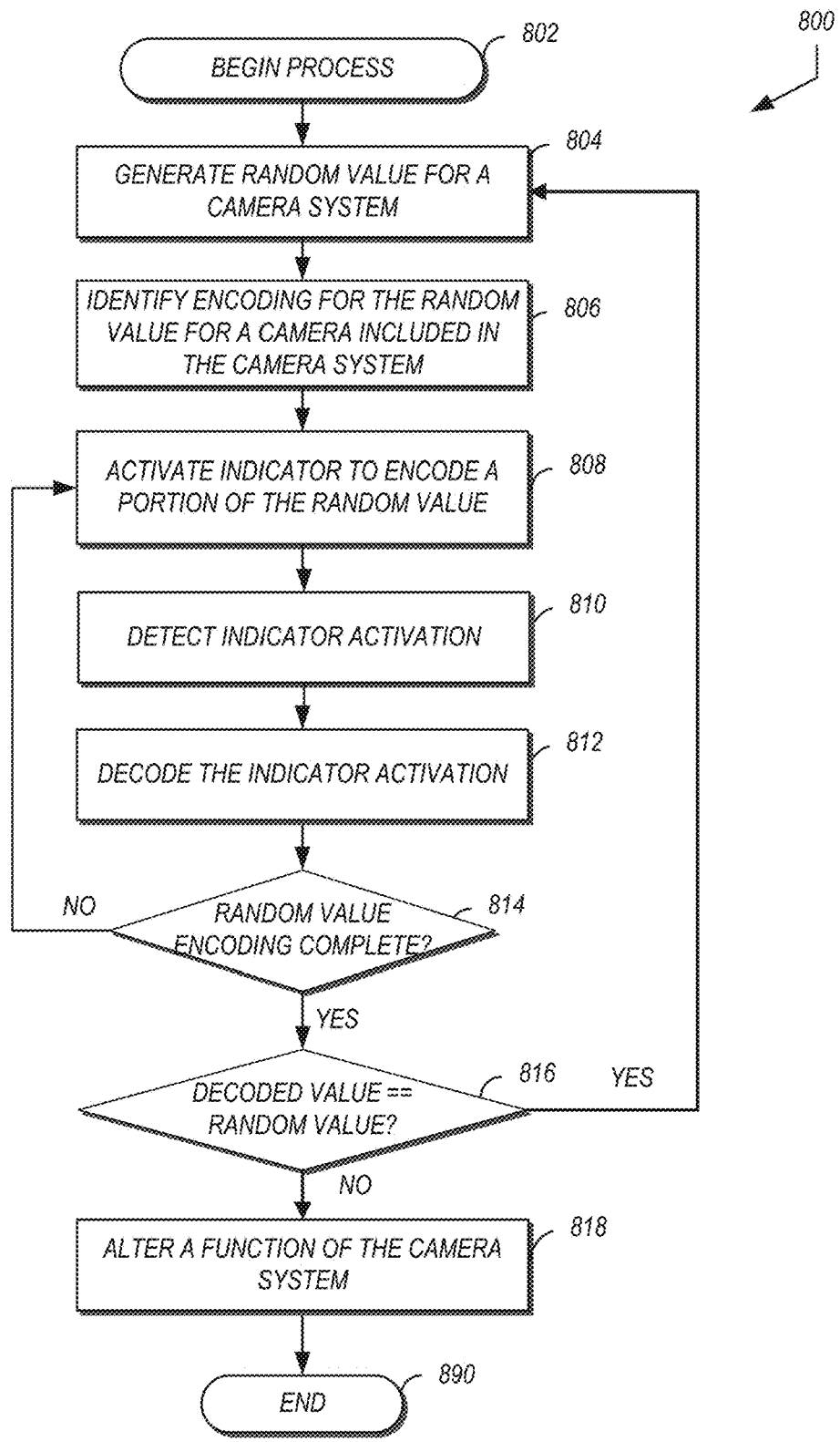
FIG. 8 is a flow diagram depicting an example method of identifying indicator disablement.

FIG. 8 is a flow diagram depicting an example method of identifying indicator disablement. The method 800 may be implemented in whole or in part by the devices described such as the camera system 200. The method 800 illustrates how a camera system may encode a random value via the indicator to provide verifiable feedback regarding the status of the indicator.

The method 800 may begin at block 802. At block 804, the feedback processor 252 may generate a random value for a camera system. The random value may be a numeric or alphanumeric machine readable value. Generating the random value may include obtaining a randomized input (e.g., random seed) such as from a sensor included in the camera system 200. The seed may be a configuration value stored by the camera system 200 such as in the memory 260 or in the feedback memory 254 in the secured location 250. The random value may be generated within a predetermined range of values (e.g., a number between 0 and 255). The range may be specified via a configuration provided to or stored by the camera system 200. In some implementations, the random number configuration may be stored in the secured location 250 of the camera system 200 to further protect the camera system 200 from unwanted tampering. Hallekalek "Good Random Number Generators are (not so) Easy to Find" Mathematics and Computers in Simulation 46 (1998) 485-505 discusses various random generators and considerations for selecting an appropriate implementation.

At block 806, the camera system 200 may identify an encoding for the random value for a sensor that will be used by the camera system 200 to detect indicator disablement. For example, if an image sensor is configured to detect emissions from the indicator 202 such as shown in FIG. 3, the capabilities of the image sensor may be a factor determining what block size to use for encoding the random value to ensure ample samples are captured to detect the encoding. The capabilities may also determine how aggressively the indicator 202 may need to be driven to generate emissions that can be detected by the image sensor 202. For example, if the image sensor 202 is a low resolution sensor, the sensitivity to brightness may limit the detectable brightness variations available for encoding the random value. In some implementations, the encoding may be preconfigured for the camera system 200. In such implementations, the encoding instructions may be stored by the camera system 200 or implemented in physical circuitry. Accordingly, the identification of the encoding may include selecting the preconfigured encoding.

At block 808, the microprocessor 290 may activate the indicator 206 of the camera system 200 to encode a portion of the random value. As discussed, the encoding may be a binary encoding. In such implementations, the activation may include adjusting the indicator to output light including a detectable property that corresponds to the encoding for the portion of the random value. As discussed in reference to FIG. 5, a measurement threshold may be provided. The activation may drive the indicator 206 to emit light above the measurement threshold to indicate a "1" and below the measurement threshold to indicate a "0."

The activation may be for a period of time. The period of time may be configured for the camera system 200 which may be specified via the feedback configuration. In some implementations, the period of time may be identified based at least in part on the frame rate of the camera or other image sensor collecting the feedback measurements. For example, a camera may operate at a fixed frame rate. A duration of time to transmit the activation signal may be generated based on the fixed frame rate so as to ensure the indicator light is activated at a time when it can be detected. This ensures the camera has an opportunity to capture at least one image corresponding to the activation signal. Whether the light is actually detected in the collected image or other measurement may be an important factor in detecting indicator light disablement.

At block 810, the image sensor may detect the indicator activation. Detecting the indicator activation may include capturing an image with a sensor such as the image sensor 202. In some implementations, the detection may include detecting the signal driving the indicator 206. For example, if the brightness of the indicator is adjusted by varying the voltage provided to the indicator 206, the detection at block 810 may include detecting the voltage.

At block 812, the indicator activation may be decoded by the feedback processor 252. Decoding may include comparing the detected activation with a threshold (e.g., measurement threshold) or a reference (e.g., baseline color measurement, reference voltage).

At block 814, the feedback processor 252 may determine whether the random value has been fully encoded (e.g., transmitted via the indicator 206). For example, if the random value is an 8-bit value, the determination may include identifying whether 8 values have been stored in the decoding buffer. If the determination at block 814 is negative, the method 800 may return to block 808 to encode and receive another portion of the random value. If the determination at block 814 is affirmative, at block 818, the feedback processor 252 may determine whether the decoded value corresponds to the random value. As shown, the correspondence at block 818 is confirming equality between the decoded value and the random value. The determination may include additional decoding of the values included in the decoding buffer. For example, if the random value is encoded using binary values, the determination may translate the binary values in the decoding buffer to a non-binary value for comparison at block 814. In some implementations, the values may represent Morse code and the translation may include generating a string of characters corresponding to the Morse code values.

If the determination at block 816 is affirmative, the method 800 may return to block 804 to generate a new random number and continue monitoring the status of the indicator. If the determination at block 816 is negative, at block 818, the feedback processor 252 may alter a function of the camera system. The alteration may include activating an alternate indicator, transmitting a message to the monitoring service 150, activating recording, deactivating recording, disabling the camera system 200 or a component included therein, terminating power to the camera system 200, or the like. At block 890 the method 800 may end until the camera system 200 is reset to indicate proper functioning of the indicator. The reset may include activation of a button included in the camera system 200. In some implementations, the reset may include receiving a reset message from the monitoring service 150.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A camera system can be or include a microprocessor, but in the alternative, the camera system can be or include a controller, microcontroller, or state machine, combinations of the same, or the like configured to generate and analyze indicator feedback. A camera system can include electrical circuitry configured to process computer-executable instructions. Although described herein primarily with respect to digital technology, a camera system may also include primarily analog components. For example, some or all of the feedback generation and verification algorithms described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by a camera system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the camera system such that the camera system can read information from, and write information to, the storage medium. In the alternative, the storage medium can be integral to the camera system. The camera system and the storage medium can reside in an application specific integrated circuit (ASIC). The ASIC can reside in an access device or other monitoring device. In the alternative, the camera system and the storage medium can reside as discrete components in an access device or other monitoring device. In some implementations, the method may be a computer-implemented method performed under the control of a computing device, such as an access device or other monitoring device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A camera system comprising:
an indicator light, wherein the indicator light emits a light based at least in part on an activation signal;
a camera configured to capture images, wherein a field of view of the camera detects at least a portion of the light emitted by the indicator light;
a non-transitory computer-readable memory storing executable instructions; and
one or more computer processors in communication with the non-transitory computer-readable memory, the camera and the indicator light, wherein the one or more computer processors are configured to execute the executable instructions to at least:
generate a random number;
determine a brightness level for encoding at least a portion of the random number;
transmit, to the indicator light, the activation signal to activate the indicator light at the brightness level;
receive, from the camera, an image captured while the indicator light is expected to emit the light at the brightness level;
detect a brightness for at least a portion of pixels included in the image;
compare the brightness to a threshold to determine a first encoded value;
determine that the first encoded value encodes a number, wherein the number is different from the at least the portion of the random number; and
disable the camera in response to determining the number is different from the at least the portion of the random number.

2. The camera system of claim 1,
wherein the camera captures the images at a fixed frame rate, and
wherein the one or more computer processors are configured to execute the executable instructions to at least identify a duration to transmit the activation signal to the indicator light based at least in part on the fixed frame rate, and
wherein the one or more computer processors cause the activation signal to be transmitted for at least the duration of time to ensure that the camera has an opportunity to capture at least one image corresponding to the activation signal.

3. The camera system of claim 1, further comprising:
an image filter configured to generate an adjusted image based at least in part on the image and the brightness, wherein the image filter normalizes the brightness of the image to a predetermined brightness level.

4. The camera system of claim 1, further comprising an audio output device, and wherein the one or more computer processors are configured to execute the executable instructions to at least activate the audio output device to provide a perceivable indication that the camera is disabled.

5. A camera system comprising:
an indicator light, wherein the indicator light emits a light in response to an activation signal;
a sensor configured to detect at least a portion of the light emitted by the indicator light;
a non-transitory computer-readable memory storing executable instructions; and
one or more computer processors in communication with the non-transitory computer-readable memory, the indicator light and the sensor, wherein the one or more computer processors are configured to execute the executable instructions to at least:
transmit, to the indicator light, an activation signal encoding at least a portion of a random value in the light emitted by the indicator light in response to the activation signal;
receive, from the sensor, a measurement of light emitted by the indicator light in response to the activation signal;
determine a first encoded value based at least in part on the measurement; and
adjust the camera system based at least in part on a comparison between the first encoded value and the at least the portion of the random value.

6. The camera system of claim 5,
wherein the sensor captures measurements at a predetermined rate, and
wherein the one or more computer processors are configured to execute the executable instructions to at least identify a duration to transmit the activation signal to the indicator light based at least in part on the predetermined rate, wherein the one or more computer processors cause the activation signal to be transmitted for at least the duration of time.

7. The camera system of claim 5,
wherein the comparison indicates that the first encoded value encodes a value that is different from the at least the portion of the random number, and
wherein the one or more computer processors are configured to execute the executable instructions to adjust the camera system by enabling at least one sensor included in the camera system in response to determining the number is different from the at least the portion of the random number.

8. The camera system of claim 7,
wherein the comparison indicates that the first encoded value encodes a value that is different from the at least the portion of the, and
wherein the one or more computer processors are configured to execute the executable instructions to adjust the camera system by disabling at least one sensor included in the camera system in response to determining the number is different from the at least the portion of the random number.

9. The camera system of claim 5, further comprising an audio output device, and wherein the one or more computer processors are configured to execute the executable instructions to adjust the camera system by at least activating the audio output device to provide a perceivable indication of the comparison.

10. The camera system of claim 5,
wherein the executable instructions for determining the first encoded value based at least in part on the measurement are stored in a non-reprogrammable portion of the non-transitory computer-readable memory, and
wherein the executable instructions to cause transmission, to the light indicator, of the activation signal are stored in a reprogrammable portion of the non-transitory computer-readable memory.

11. The camera system of claim 5,
wherein the measurement comprises a color quality of the light, the color quality comprising at least one of: brightness, color, intensity, or hue, and
wherein the one or more computer processors are configured to execute the executable instructions to at least:
determine a quality level for encoding at least a portion of the random number, wherein the activation signal indicates the quality level; and
detect a quality for at least a portion of an image captured by the sensor while the indicator light is expected to emit the light at the quality level, wherein determining the first encoded value comprises comparing the quality to a threshold.

12. The camera system of claim 5, wherein the one or more computer processors are configured to execute the executable instructions to at least store a count of consecutive random values that did not correspond to the encoded values, wherein adjusting the camera system is based at least in part a relationship between the count and a failure threshold.

13. The camera system of claim 5, wherein the one or more computer processors are configured to execute the executable instructions to at least generate the random number based at least in part on a measurement obtained by one or more sensors included in the camera system.

14. A computer-implemented method comprising:
under control of one or more processing devices in communication with an indicator light and a sensor, wherein the indicator light emits a light in response to an activation signal, and wherein the sensor is configured to detect at least a portion of the light emitted by the indicator light,
transmitting, to the indicator light, an activation signal encoding at least a portion of a random value in the light emitted by the indicator light in response to the activation signal;
receiving, from the sensor, a measurement of light emitted by the indicator light in response to the activation signal;
determining a first encoded value based at least in part on the measurement; and
adjusting a camera system in communication with the one or more processing devices based at least in part on a comparison between the first encoded value and the at least the portion of the random value.

15. The computer-implemented method of claim 14, further comprising:
capturing measurements at a predetermined rate; and
identifying a duration to transmit the activation signal to the indicator light based at least in part on the predetermined rate, wherein the one or more computer processors cause the activation signal to be transmitted for at least the duration of time.

16. The computer-implemented method of claim 14,
wherein the comparison indicates that the first encoded value encodes a value that is different from the at least the portion of the random number, and
wherein adjusting the camera system comprises disabling at least one sensor included in the camera system.

17. The computer-implemented method of claim 14,
wherein the comparison indicates that the first encoded value encodes a value that is different from the at least the portion of the random number, and
wherein adjusting the camera system comprises enabling at least one sensor included in the camera system.

18. The computer-implemented method of claim 14, wherein adjusting the camera system comprises at least activating an audio output device to provide a perceivable indication of the comparison.

19. The computer-implemented method of claim 14,
wherein the measurement comprises a color quality of the light, and
wherein the computer-implemented method further comprises:
determining a quality level for encoding at least a portion of the random number, wherein the activation signal indicates the quality level; and
detecting a quality for at least a portion of an image captured by the sensor while the indicator light is expected to emit the light at the quality level, wherein determining the first encoded value comprises comparing the quality to a threshold.

20. The computer-implemented method of claim 14, further comprising:
storing a count of consecutive random values that did not correspond to the encoded values, and wherein adjusting the camera system is based at least in part a relationship between the count and a failure threshold.

* * * * *